US010819662B2

(12) United States Patent
Hurst (10) Patent No.: US 10,819,662 B2
(45) Date of Patent: Oct. 27, 2020

(54) DETECTING AUTOMATIC REPLY CONDITIONS

(71) Applicant: AirWatch LLC, Atlanta, GA (US)

(72) Inventor: Evan Hurst, Atlanta, GA (US)

(73) Assignee: Airwatch, LLC, Atlanta, GA (US)

( * ) Notice: Subject to any disclaimer, the term of this patent is extended or adjusted under 35 U.S.C. 154(b) by 0 days.

(21) Appl. No.: 14/669,791

(22) Filed: Mar. 26, 2015

(65) Prior Publication Data

US 2016/0285789 A1    Sep. 29, 2016

(51) Int. Cl.
*H04L 12/58* (2006.01)
(52) U.S. Cl.
CPC ..................... *H04L 51/02* (2013.01)
(58) Field of Classification Search
CPC ..................................... H04L 51/02
See application file for complete search history.

(56) References Cited

U.S. PATENT DOCUMENTS

| | | | | |
|---|---|---|---|---|
| 6,580,787 B1* | 6/2003 | Akhteruzzaman | ...... | H04M 3/42 379/67.1 |
| 7,386,595 B1* | 6/2008 | Bloomer, Jr. | ........ | G06Q 10/107 709/203 |
| 8,406,745 B1* | 3/2013 | Upadhyay | ............. | H04L 51/066 379/88.11 |
| 8,510,392 B2* | 8/2013 | Ordille | ................... | G06Q 10/00 709/203 |
| 9,148,302 B2* | 9/2015 | Tysowski | ............... | G06Q 10/10 |
| 2003/0215067 A1* | 11/2003 | Ordille | ............ | G06F 17/30864 379/88.13 |
| 2003/0217109 A1* | 11/2003 | Ordille | ................... | G06Q 10/00 709/206 |
| 2004/0254998 A1* | 12/2004 | Horvitz | ............... | G06Q 10/107 709/206 |
| 2009/0150500 A1* | 6/2009 | Kumar | .................... | H04L 51/00 709/206 |
| 2010/0318615 A1* | 12/2010 | Griffin | ................ | G06Q 10/107 709/206 |
| 2011/0010218 A1* | 1/2011 | Gupta | .................... | G06Q 10/10 705/7.18 |
| 2011/0087744 A1* | 4/2011 | Deluca | ................. | G06Q 10/107 709/206 |
| 2012/0317615 A1* | 12/2012 | Geva | ....................... | G06F 21/31 726/3 |
| 2013/0031184 A1* | 1/2013 | Avitabile | ............. | G06Q 10/109 709/206 |
| 2013/0097269 A1* | 4/2013 | Plotkin | ................... | H04L 51/02 709/206 |
| 2014/0370857 A1* | 12/2014 | Bovis | ...................... | H04W 4/16 455/414.1 |
| 2015/0073895 A1* | 3/2015 | Karnin | ............... | G06Q 30/0251 705/14.49 |

* cited by examiner

Primary Examiner — Azizul Choudhury
(74) Attorney, Agent, or Firm — Thomas|Horstemeyer, LLP (57) ABSTRACT

Disclosed are various examples for facilitating the detection of conditions associated with an automatic reply associated with an email account. The automatic reply capability associated with an email account can be automatically activated in response to a condition associated with a client device, an email message, or an event stored in the user's calendar. An automatic reply message can be activated automatically or overridden by a user.

17 Claims, 7 Drawing Sheets

DETECTING AUTOMATIC REPLY CONDITIONS

BACKGROUND

An enterprise and/or its users may have email accounts with an automatic reply capability that allows a user to activate automatic replies that are sent from the user's email account for various reasons. For example, a user may be on vacation, on medical leave, traveling for business, or otherwise away from a home location or indisposed. In such a scenario, a user may wish to activate an automatic reply capability in which an automatic reply or an "out of office" reply is sent to users sending an email to the email account of the user. In some scenarios, an enterprise with which the user is associated may wish to facilitate or impose policies that require the user to activate automatic replies when the user is out of office or indisposed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3-6B are drawings of an example scenario according to various examples of the present disclosure.

DETAILED DESCRIPTION

An enterprise or users of an enterprise may wish to employ an automatic reply capability of an email account in order to indicate to users sending an email message to a particular user that he or she is out of office, on vacation, traveling for business, or otherwise indisposed. In some scenarios, a user's employer or organization with which the user is affiliated may wish to impose policies that require or encourage users to activate an automatic reply capability when the user is traveling or when the user may have inconsistent access to their email. Accordingly, examples set forth by this disclosure describe systems and methods in which conditions can be detected that indicate that a user may wish to activate automatic replies in connection with the user's email account. Examples of the disclosure can either automatically activate an automatic reply capability of the user's email account or facilitate the user's activation of automatic replies via user interfaces presented on a client device associated with the user.

Figure 1:
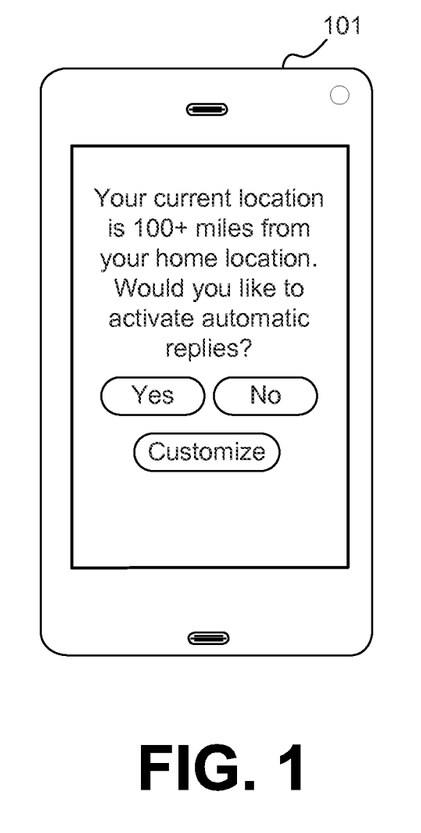
FIG. 1 is a drawing of an example scenario according to various examples of the present disclosure.

As shown in the example scenario of FIG. 1, a client device 101 can comprise a smartphone, a mobile device, or any other computing device. In the depicted scenario, an application executed by the client device 101 or a server that is located remotely from the client device 101 can detect when a location of the client device 101 is a threshold distance away from a home location or any other defined location. A home location or defined location can be a location that is specified by the user as the user's home, office location, a city in which the user lives or works, or any other location that can be specified by the user as a home location. A home location can also be specified by an administrator or an enterprise as a location in which the user works or is primarily located for business.

Upon detecting that the location of the client device 101 is a threshold distance away from the home location, an application executed by the client device 101 can generate a user interface that allows the user to confirm whether they would like to activate an automatic reply capability associated with an email account of the user. In the depicted scenario, the user may activate automatic replies using user interface elements rendered upon a display of the client device 101, which can activate an automatic reply capability provided by a mail server that is located remotely from the client device 101. In one scenario, the user can select an automatic reply message that has been automatically generated on behalf of the user or create or customize a customized automatic reply message. Additional examples and scenarios are discussed herein.

Figure 2:
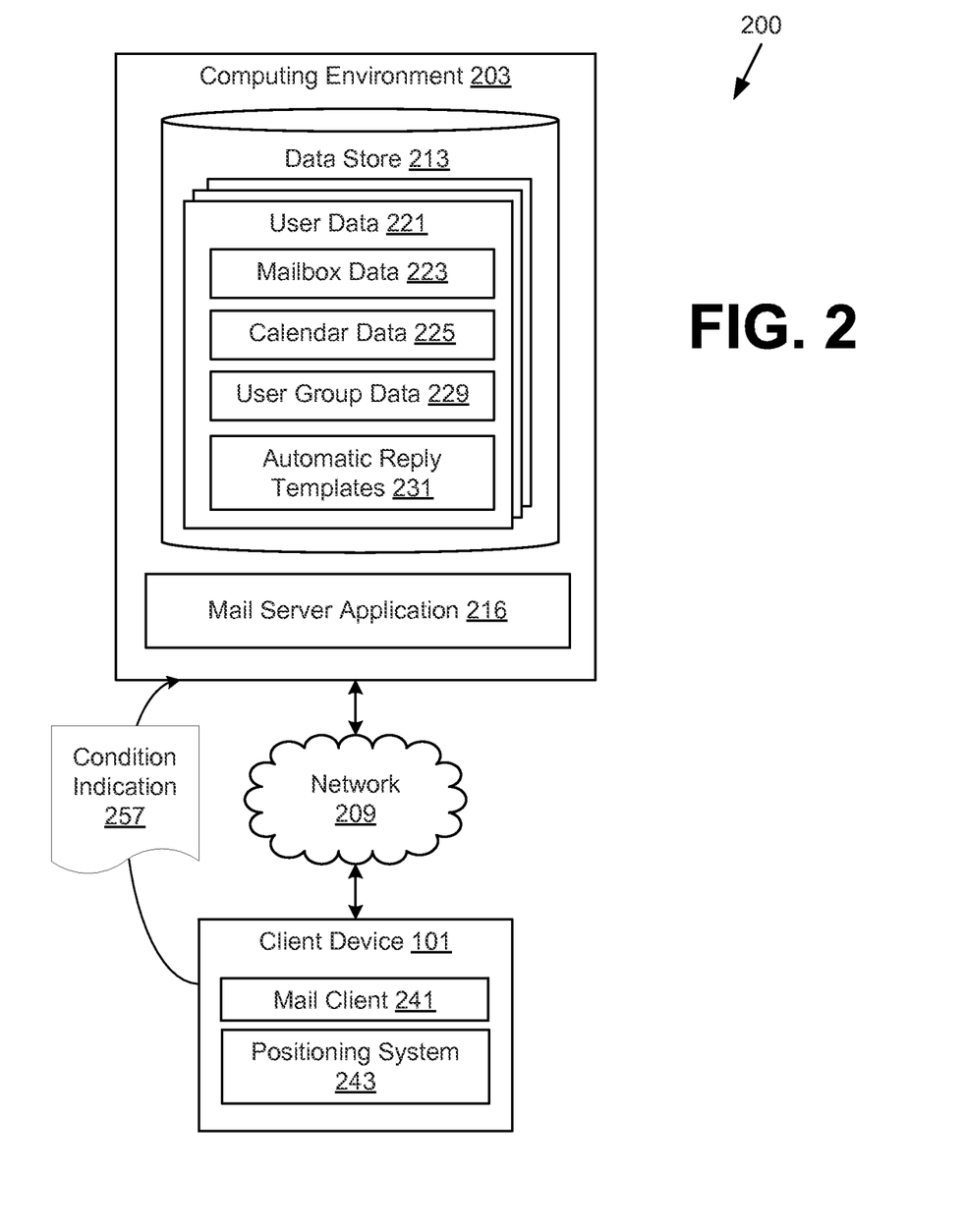
FIG. 2 is a drawing of a networked environment according to various examples of the present disclosure.

With reference to FIG. 2, shown is a networked environment 200 according to various examples. The networked environment 200 includes a computing environment 203 and one or more client devices 101 which are in data communication with each other via a network 209. The network 209 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks. In the depicted example of FIG. 2, the depicted computing environment 203 and client device 101 are shown merely for illustrative purposes to describe how examples of the disclosure may operate. It should be appreciated that the illustrated devices can be deployed in various ways and that the depicted illustration is non-limiting.

The computing environment 203 may comprise, for example, a server computer or any other system providing computing capability. Alternatively, the computing environment 203 may comprise a plurality of computing devices that are arranged, for example, in one or more server banks or computer banks or other arrangements. For example, the computing environments 203 may comprise a grid computing resource and/or any other distributed computing arrangement. Such computing devices may be located in a single installation or may be distributed among many different geographical locations. For purposes of convenience, the computing environment 203 is referred to herein in the singular. Even though the computing environment 203 is referred to in the singular, it is understood that a plurality of computing environments 203 may be employed in the various arrangements as described above.

The data store 213 may be representative of memory of the computing environment 203, mass storage resources of the computing environment 203 or any other storage resources on which data may be stored by the computing environment 203. The data store 213 may also be representative of a plurality of data stores 213 as can be appreciated. The data stored in the data store 213, for example, is associated with the operation of the various applications and/or functional entities described below.

The components executed by the computing environment 203, for example, include a mail server application 216 and other applications, services, processes, systems, engines, or functionality not discussed in detail herein. The mail server application 216 provides mail server functionality and can include multiple mail servers executed by a computing environment 203 to provide access to enterprise data on behalf of a user base. The mail server application 216 can facilitate remote access to email, calendar information, contacts or other resources on behalf of a user. The mail server application 216 can facilitate download and/or synchronization of email, calendar information, contacts and/or tasks that are stored in a user's mailbox. In some examples, the mail server application 216 can implement a mail synchronization standard or specification, such as MICROSOFT ACTIVESYNC, that facilitates synchronization of a user's data with a client device 101 assigned to the user. The mail server application 216 can also send and receive email messages, calendar appointment requests and other messages on behalf of a user to other mail servers that are accessible to the mail server application 216 via a network connection.

The data stored in the data store 213 includes, for example, user data 221 and potentially other data. The user data 221 can include data associated with a user account, such as mailbox data 223, calendar data 225, user group data 229 and automatic reply templates 231. Mailbox data 223 can include data associated with one or more mailboxes corresponding to a user account of a user. The mailbox data 223 can include electronic mail messages, mail folders into which messages are organized, filtering rules that are applied to incoming and/or outgoing mail messages, attachments associated with mail messages, and/or other data associated with a mailbox of a user. User data 221 can also include access settings, such as authentication credentials, delegation settings (e.g., information about other users who may be provided access to the user data 221 of a particular user), mail and document retention rules and/or policies, and/or other geographic access restrictions or limitations (e.g., information about certain locations and/or networks from which user data 221 can be accessed).

Calendar data 225 can include, for example, calendar information such as appointments, reminders, tasks and/or other data that can be associated with a timestamp or date stamp. Calendar data 225 can include appointments that are associated with a particular location and/or user. For example, an appointment can be linked with a particular location, meeting room, building, address or other location. An appointment can also be linked with another user who is internal or external to an organization or domain of the user as well as with text and/or attachments. Calendar data 225 can also include tasks, reminders, or other types of data that can be associated with a time and/or place and placed on a calendar. It should be appreciated that a client device 101 of a user may also be synchronized with various other forms of data other than mailbox data 223 and/or calendar data 225 and that the depicted example is shown merely for illustrative purposes.

User data 221 for a particular user can also include user group data 229, which identifies a particular group of users within an enterprise to which a particular user belongs. User group data 229 can also identify a manager and/or subordinates associated with a particular user as well as an identity of one or more users that can be indicated as a fallback user or a back-up contact for a particular user when the user is out of the office or otherwise unavailable. User data 221 can also include other account settings, such as biographical or demographic information about a user, password reset information, multi-factor authentication settings, and other data related to a user account as can be appreciated.

For example, a client device 101 of a user may also be synchronized or provided access to documents, media or other types of files that are stored in a data store 213 via a mail server application 216 or other type of synchronization application in accordance with various examples of the present disclosure. The client device 101 can be configured to access such resources that are stored in or on the client device 101, in a data store 213 or any other location via any type of application executed by the client device 101. The depicted example of a mail client 241 being configured to access mailbox data 223 and/or calendar data 225 is but one example.

Automatic reply templates 231 comprise templates from which automatic reply messages can be selected or generated on behalf of a particular user. In some cases, an automatic reply template 231 can comprise a static and preconfigured automatic reply message that can be selected by a user, the mail client 241 or the mail server application 216 and associated with an automatic reply capability associated with the mail server application 216.

The client device 101 is representative of a plurality of client devices that may be coupled to the network 109. The client device 101 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 101 may include a display that comprises, for example, one or more devices such as liquid crystal display (LCD) displays, gas plasma-based flat panel displays, organic light emitting diode (OLED) displays, LCD projectors or other types of display devices.

The client device 101 may be configured to execute various applications, such as a mail client 241. The mail client 241 may be executed to facilitate access to user data 221 of a user, such as mailbox data 223, calendar data 225 and/or other data. In examples of the instant disclosure, the mail client 241 is configured to render various interfaces that can facilitate a user's activation of an automatic reply capability of an email account of the user as well as the selection or editing of an automatic reply message associated with such a capability. The client device 101 can also be configured with a positioning system 243, such as a global positioning system (GPS) capability that can be employed to obtain location data associated with the client device 101. Although illustrated as a part of computing environment 203, the client device 101 mail also store mailbox data 223, calendar data 225, user group data 229 and automatic reply templates 231.

Next, a general description of the operation of the various components of the networked environment 200 is provided. Examples of the present disclosure facilitate activation of an automatic reply capability of an email account associated with a user. Users associated with an email account can often forget to activate automatic reply capabilities associated with an email account when traveling for personal or work reasons. Accordingly, examples of the disclosure can detect an indication that a user may be out of the office or otherwise indisposed, at which point the user can be prompted whether he or she wishes to activate an automatic reply capability associated with the email account. In either scenario, systems and methods of the disclosure can facilitate proactive activation of an automatic reply capability when an indication that a user may be out of the office, on vacation or have limited availability in the future is detected.

In one example, the user data 221 associated with a particular email account can be associated with a home location. Such a home location can be specified by a user or an enterprise to which the user is affiliated. Accordingly, the mail server application 216 or mail client 241 can detect an indication of travel by detecting that the client device 101 is a threshold distance away from the home location. Such a threshold distance can be configurable by a user or an administrator of the client device 101 or the mail server application 216.

In some scenarios, the threshold distance can be specified by user group such that users associated with a particular role in an enterprise may be considered out of office when traveling a shorter distance away from the home location than another user with a different role within the enterprise. For example, a user group associated with a role in an organization, such as information technology support, may be considered out of office when traveling a shorter distance away from the home location than a user group associated with a different role, such as a user associated with a traveling sales associate user group.

Proactive detection of a condition that can be linked with an out of office state can be performed by the mail server application 216 or the mail client 241 by an analysis of the content of one or more email messages received or sent by a user via an email account or events stored in a calendar associated with the email account. For example, the mail server application 216 or mail client 241 can analyze the content of email messages to determine whether a flight number, a flight reservation, a flight confirmation, a hotel confirmation, a rental car reservation, a train reservation, or any other indication of travel by a threshold distance from the home location is contained within a particular email message or event stored in a calendar of an email account. The mail server application 216 or mail client 241 can make such a determination by performing a textual analysis of the content of a particular email message or event to determine whether the text is associated with a travel indication. In one example, mail server application 216 or mail client 241 can analyze whether textual content of a message conforms with a format specification of a flight reservation code, a hotel reservation code, a rental car reservation code, or any other format of content indicative of travel that can be specified.

In another example, the mail server application 216 or mail client 241 can determine whether the textual content of a message contains a particular flight number, an indication of a hotel, or an airport name or airport code. Such a determination can be made by querying text in the message against a database or other source of flight numbers, text identifying a hotel, airport names or codes and other indications of travel that can be created and updated within the data store 213 or another computing environment. Upon detecting an indication of travel, the mail server application 216 or mail client 241 can then identify a departure date and/or a return date within the particular message or event. To identify a departure date, the mail server application 216 or mail client 241 can attempt to identify keywords indicating a departure and perform a corresponding identification for keywords indicating a return or an end of a trip. In the case of a calendar event, the mail server application 216 or mail client 241 can identify a date associated with the calendar event containing content indicative of travel. Another example of content indicative of travel can include an event on a user's calendar, such as a meeting, convention, or other type of event, that is in a location that is a threshold distance away from the home location.

In another example, the mail server application 216 or mail client 241 can analyze the content of email messages and/or calendar events for other indication of a user being out of office or unavailable, such as "vacation," "leave," "out of office," etc. In one scenario, if an event is created on a user's calendar with a keyword that can be associated with an automatic reply condition, the mail server application 216 or mail client 241 can activate automatic replies automatically or can prompt the user to do so. In one scenario, the mail server application 216 or mail client 241 can maintain a database of keywords that can be associated with such a condition, and when one or more of such keywords is detected within the content or an email message or a calendar event, the automatic reply condition can be identified.

Systems and methods of the disclosure can also facilitate reactive activation of an automatic reply capability when a condition that a user may be out of the office, on vacation or have limited availability in the future is detected. The mail server application 216 or mail client 241 can detect such a condition based upon a condition indication 257 generated by the mail client 241. In one scenario, the condition indication 257 can comprise a location of the client device 101 obtained from the positioning system 243. Should the location of the client device 101 indicate that the user is located a threshold distance away from the home location, the mail server application 216 or mail client 241 can activate an automatic reply capability or prompt the user to do so. A condition indication 257 associated with the location of the client device 101 can also comprise an indication of a roaming state of the client device 101, a network address of the client device 101 or an identification of a wireless network with which the client device 101 is in communication.

In such a scenario, the mail server application 216 or mail client 241 can determine that the user may be away from the home location by determining an approximate geolocation of the client device 101 based upon a network address or determining whether the client device 101 is in a roaming state (e.g., a country in which the client device 101 is roaming). If the approximate location of the client device 101 is a threshold distance away from the home location, the mail server application 216 or mail client 241 can activate an automatic reply capability of the email account or prompt the user to do so. In another scenario, the condition indication 257 can also include an indication that the client device 101 has been placed into a personal mode. Such an indication in combination with a location indication can be employed to determine that the user may wish to activate an automatic reply capability.

The mail server application 216 or mail client 241 can also generate an automatic reply message associated with the automatic reply capability on behalf of a user upon a proactive or reactive determination of a condition associated with automatic replies. The mail server application 216 or mail client 241 can select a template from the automatic reply templates 231 associated with a particular email account and can generate an automatic reply message based upon the detected condition. For example, if the mail server application 216 or mail client 241 can detect a departure date and a return date associated with travel of a user, a particular automatic reply template 231 can be selected in which a departure date and a return date are indicated in the automatic reply message associated with the email account.

The mail server application 216 or mail client 241 can also populate an automatic reply template 231 with the identity of another user associated with another email account to whom inquiries or emergencies should be directed in the absence of a user for whom automatic replies has been activated. In one scenario, the mail server application 216 can identify a subordinate or a manager of a particular user from the user group data 229 or an organizational chart that is accessible in the data store 213 and populate an automatic reply template 231 with the identity, contact information or other contact identifiers, such as phone and email contact information of a subordinate user or a manager of the user associated with the email account. The mail server application 216 can identify another user to whom inquiries or emergencies should be directed in the absence of the user by querying a directory service that identifies relationships between users in an enterprise. The directory service can be accessible through an application programming interface (API) that provides the ability to query a backup user or a delegate of a particular user.

As another example, a particular automatic reply template 231 can be selected based upon an identity of a sending user of a particular email message sent to the email account of the user. In one example, a user may identify certain users in an address book or an enterprise user group as a certain class users for which a particular automatic reply message is sent, where other users in the address book or enterprise user group receive another automatic reply message.

Figure 3:
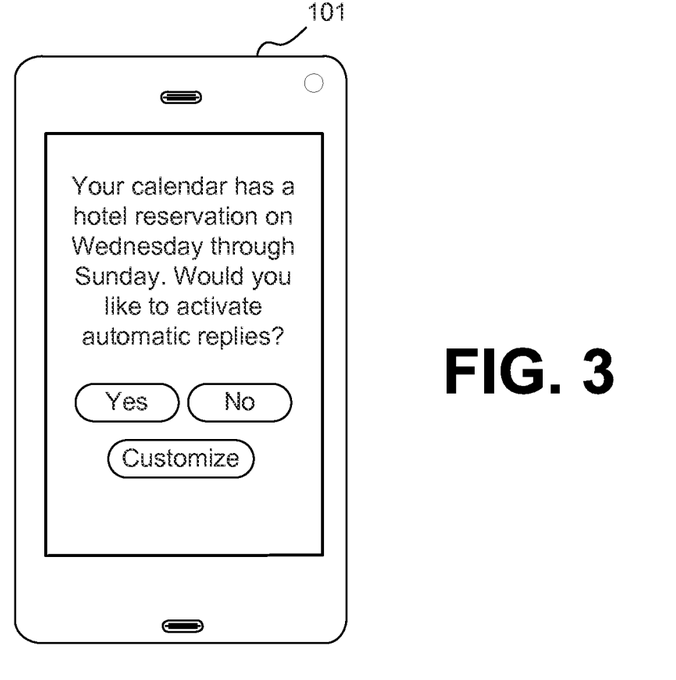

Referring next to FIG. 3, shown is a scenario illustrating an example user interface that can be generated by the mail client 241 on the client device 101 in response to detection of a condition indication 257 associated with activation of an automatic reply capability of a user's email account. As noted above, detection of such a condition can be performed locally by a mail client 241 or by a mail server application 216 in response to receiving a condition indication 257 from the client device 101. Accordingly, in either scenario, the mail client 241, in response to detection of such a condition or in response to a command received from the mail server application 216, can render a user interface that allows a user to activate automatic reply capabilities of the email account or customize an automatic reply message prior to activating such a capability. In contrast to the example set forth in FIG. 1, the mail server application 216 or mail client 241 can detect a particular calendar event associated with a travel indication rather than, or in addition to, detecting the location of the client device 101. If such a travel indication is detected, the mail client 241 can be configured to render a user interface allowing the user to activate an automatic reply capability.

Accordingly, examples of the disclosure create a low friction user experience with respect to activating automatic reply capabilities associated with the email accounts of the user as well as generating a reminder that the user may wish to activate automatic replies in response to detection of certain conditions. As shown in the example of FIG. 3, a user can also refuse or override activation of the automatic reply capability of the user's email account.

Figure 4:
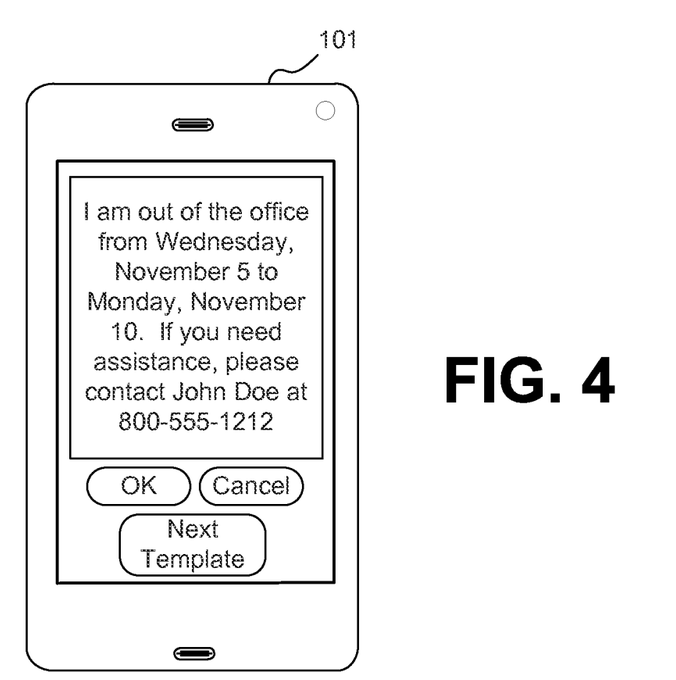

Continuing the example of FIG. 3, reference is now made to FIG. 4, which illustrates an example user interface that can be generated by the mail client 241 on the client device 101 in response to a user indication that he or she wishes to activate automatic reply capabilities of an email account or customize an automatic reply message associated with the email account. As shown in the example of FIG. 4, the mail server application 216 or mail client 241 can generate an automatic reply message from an automatic reply template 231 and populate the automatic reply template 231 with information that can be detected from the user's calendar or email message content, such as a beginning date and an ending date of the automatic reply setting associated with the email account. Additionally, the mail server application 216 or mail client 241 can also populate the automatic reply message with the identity and/or contact identifier of a second user identified as a back-up contact for the user.

Figure 5:
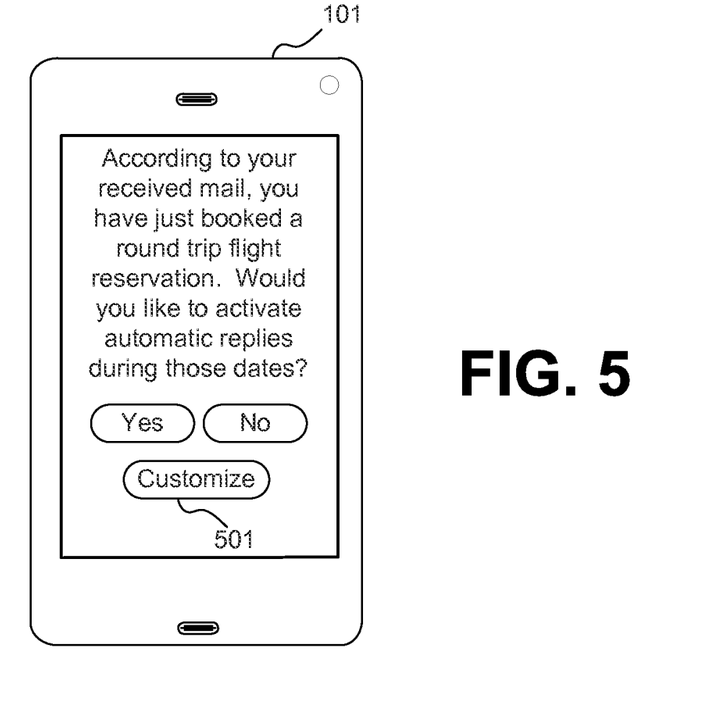

Referring next to FIG. 5, shown is a scenario illustrating an example user interface that can be generated by the mail client 241 on the client device 101 in response to detection of a condition indication 257 associated with activation of an automatic reply capability of a user's email account. In the example of FIG. 5, the mail server application 216 or mail client 241 can detect, based on a content of an email message associated with an email account of a user or an event stored in a calendar of a user, a condition indicating that the user is traveling or otherwise indisposed such that the user should be prompted whether an automatic reply setting associated with the email account of the user should be activated.

As depicted in FIG. 5, the mail client 241 can generate a user interface informing the user of a detected condition, such as receipt of an email message containing a flight reservation or another travel condition. The user interface also allows a user to activate an automatic reply capability associated with the user's email account or refuse activation of the automatic reply capability. The user interface can also allow the user to customize an automatic reply message associated with the automatic reply capability should the user select user interface element 501.

Figure 6A:
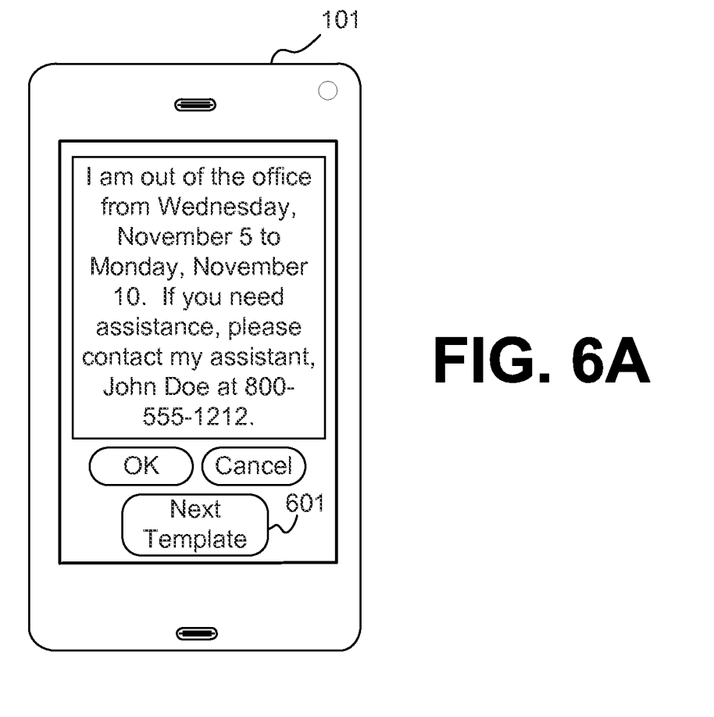

Continuing the example of FIG. 5, reference is now made to FIG. 6A, which illustrates an example user interface that can be generated by the mail client 241 on the client device 101 in response to a user indication that the user wishes to activate automatic reply capabilities of an email account or customize an automatic reply message associated with the email account. FIG. 6A also illustrates how a user may select from multiple automatic reply templates 231 associated with a particular user. In the example of FIG. 6A, the mail client 241 can display a user interface that allows the user to accept or edit an automatic reply message generated by the mail server application 216 or the mail client 241. Additionally, the user can select another automatic reply template 231 by selecting user interface element 601.

Figure 6B:
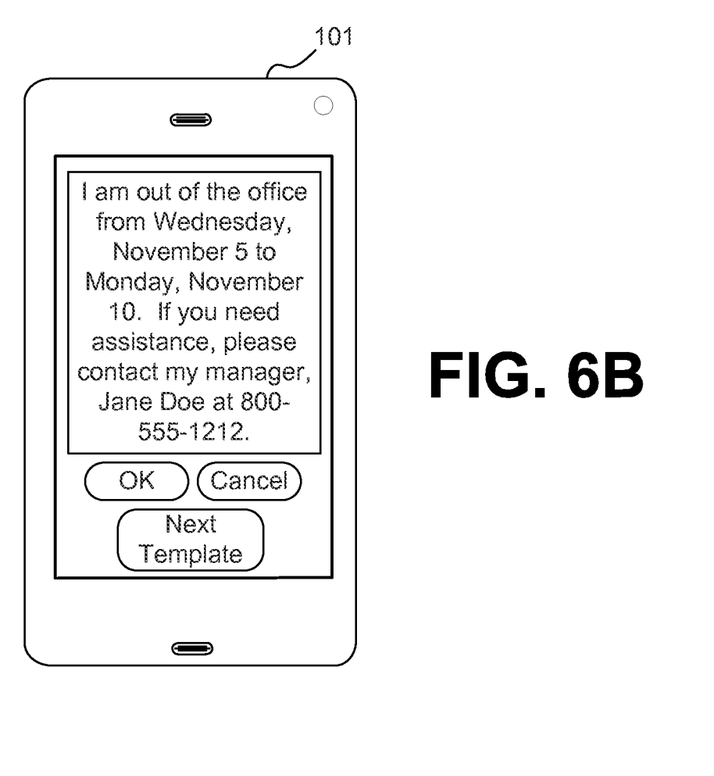

Continuing the example of FIG. 6A, reference is now made to FIG. 6B, which illustrates an example of an alternative automatic reply template 231 that can be selected by the user as an automatic reply message. In contrast to the example of FIG. 6A, the automatic reply template 231 shown in FIG. 6B identifies a different user as a back-up content for the user for whom the automatic reply capability is being activated.

Figure 7:
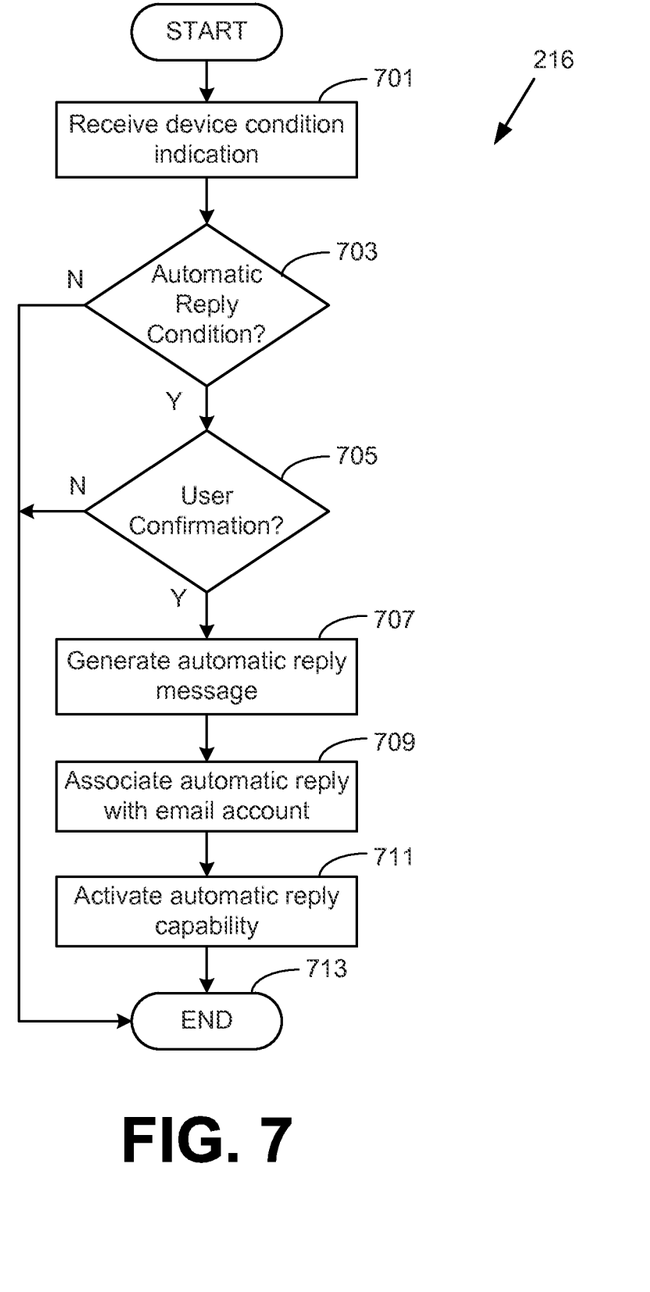
FIGS. 7-8 are flowcharts illustrating examples of functionality implemented as portions of components executed in the networked environment of FIG. 2 according to various examples of the present disclosure.

Referring next to FIG. 7, shown is a flowchart that provides one example of the operation of a portion of the mail server application 216 according to various examples. It is understood that the flowchart of FIG. 7 provides merely an example of the many different types of functional arrangements that may be employed to implement the operation of the portion of the mail server application 216 as described herein. As an alternative, the flowchart of FIG. 7 may be viewed as depicting an example of elements of a method implemented in the computing environment 203 (FIG. 2) according to one or more examples. Functionality attributed to the mail server application 216 can be implemented in a single process or application executed by the computing environment 203 and/or multiple processes or applications. The separation or segmentation of functionality as discussed herein is presented for illustrative purposes only.

First, at step 701, the mail server application 216 can receive a condition indication 257 from the client device 101. As described above, a condition indication 257 can include a location of the client device 101, a network address of the client device 101, a roaming status of the client device 101, or any other status indicator associated with the client device 101 that can be obtained by the mail client 241. At step 703, the mail server application 216 can determine whether the condition indication 257 indicates that an automatic reply capability of the email account of the user should be activated. In some scenarios, the location indication can also indicate that an automatic reply capability should be deactivated, in which case the mail server application 216 can initiate deactivation of an automatic reply capability of the email account of the user. For example, should the location of the client device 101 indicate that the client device 101 be within the home location of the user, the mail server application 216 can deactivate an automatic reply capability of the email account.

If the condition indication 257 indicates that an automatic reply capability should be activated, at step 705 the mail server application 216 can initiate rendering of a user interface by the mail client 241 through which the user can confirm that the user wishes to activate an automatic reply capability or deny activation of the automatic reply capability. If the user denies activation of the automatic reply capability, the process proceeds to completion at step 713. If the user confirms activation of the automatic reply capability, the process proceeds to step 707, where the mail server application 216 can generate an automatic reply message to be associated with the email account. As noted above, the automatic reply message can be generated from an automatic reply template 231 and potentially customized by the user via the mail client 241. At step 709, the mail server application 216 can associate the automatic reply message with an automatic reply capability of the mail account and activate the automatic reply capability at step 711. Thereafter, the process proceeds to completion at step 713.

Figure 8:
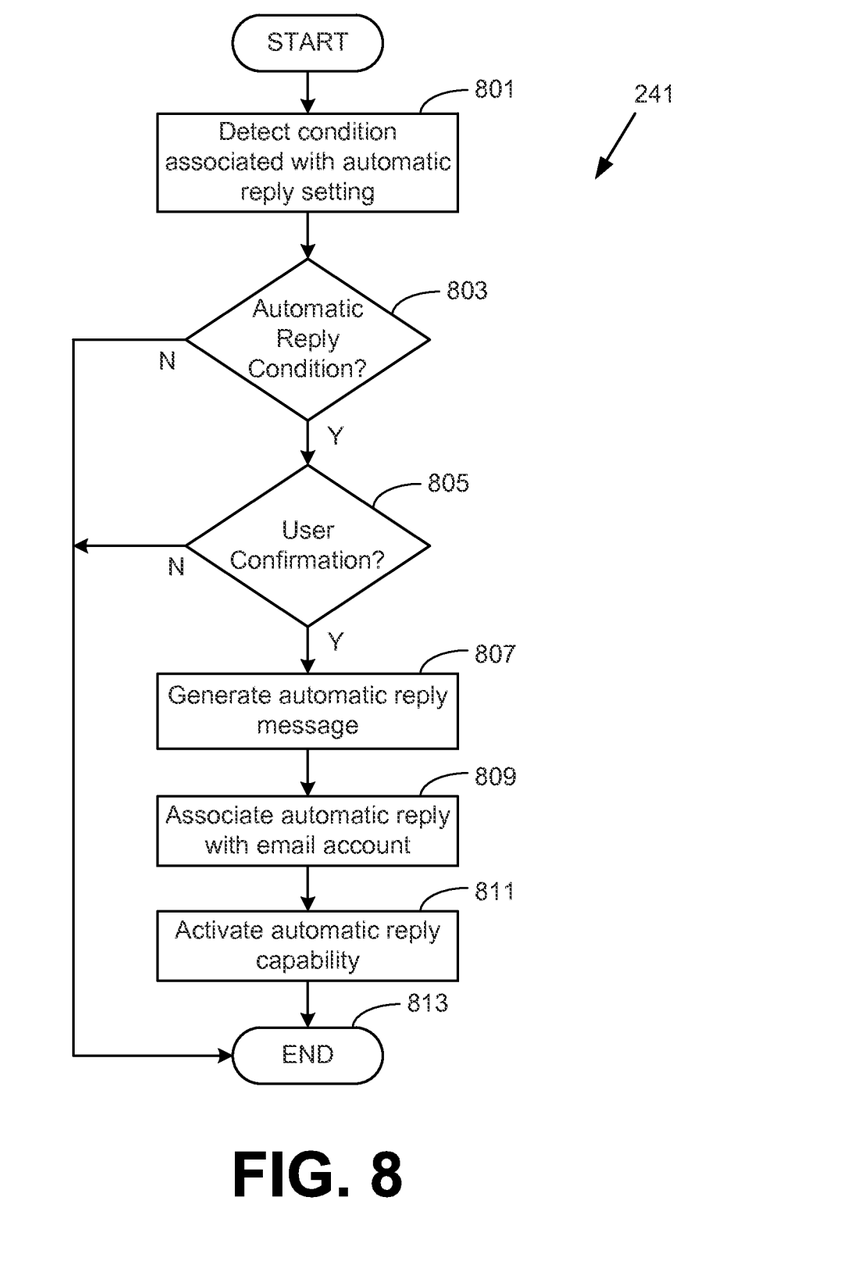

Referring next to FIG. 8, shown is a flowchart that provides one example of the operation of a portion of the mail client 241 according to various examples. It is understood that the flowchart of FIG. 8 provides merely an example of the many different types of functional arrangements that may be employed to implement the operation of the portion of the mail client 241 as described herein. As an alternative, the flowchart of FIG. 8 may be viewed as depicting an example of elements of a method implemented in the client device 101 according to one or more embodiments. Functionality attributed to the mail client 241 can be implemented in a single process or application executed by the client device 101 and/or multiple processes or applications. The separation or segmentation of functionality as discussed herein is presented for illustrative purposes only.

First, at step 801, the mail client 241 can detect a condition associated with the client device 101, an email message or a calendar event that is potentially associated with an automatic reply capability. At step 803, the mail client 241 can determine whether the condition indicates that an automatic reply capability of the email account of the user should be activated. In some scenarios, the location indication can also indicate that an automatic reply capability should be deactivated, in which case the mail client 241 can initiate deactivation of an automatic reply capability of the email account of the user. For example, should the location of the client device 101 indicate that the client device 101 be within the home location of the user, the mail client 241 can deactivate an automatic reply capability of the email account or prompt a user to request whether automatic replies should be disabled.

If the condition indication 257 indicates that an automatic reply capability should be activated, the mail client 241 can initiate rendering of a user interface by the client device 101 through which the user can confirm that the user wishes to activate an automatic reply capability or deny activation of the automatic reply capability. If the user denies activation of the automatic reply capability, the process proceeds to completion at step 813. If the user confirms activation of the automatic reply capability, the process proceeds from step 805 to step 807, where the mail client 241 can generate an automatic reply message to be associated with the email account. As noted above, the automatic reply message can be generated from an automatic reply template 231 and can be customized by the user via the mail client 241. At step 809, the mail client 241 can associate the automatic reply message with an automatic reply capability of the mail account and activate the automatic reply capability at step 811. Thereafter, the process proceeds to completion at step 813.

The client device 101 or devices comprising a computing environment can include at least one processor circuit, for example, having a processor and at least one memory device, both of which are coupled to a local interface, respectively. Such a device may comprise, for example, at least one computer, a mobile device, smartphone, computing device or like device. The local interface may comprise, for example, a data bus with an accompanying address/control bus or other bus structure as can be appreciated.

Stored in the memory device are both data and several components that are executable by the processor. In particular, stored in the one or more memory device and executable by the processor of such a device can be the mail server application 216, the mail client 241 and potentially other applications. Also stored in the memory may be a data store 213 and other data.

A number of software components are stored in the memory and are executable by a processor. In this respect, the term "executable" means a program file that is in a form that can ultimately be run by the processor. Examples of executable programs may be, for example, a compiled program that can be translated into machine code in a format that can be loaded into a random access portion of one or more of the memory devices and run by the processor, code that may be expressed in a format such as object code that is capable of being loaded into a random access portion of the one or more memory devices and executed by the processor, or code that may be interpreted by another executable program to generate instructions in a random access portion of the memory devices to be executed by the processor, etc. An executable program may be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor may represent multiple processors and/or multiple processor cores, and the one or more memory devices may represent multiple memories that operate in parallel processing circuits, respectively. Memory devices can also represent a combination of various types of storage devices, such as RAM, mass storage devices, flash memory, hard disk storage, etc. In such a case, a local interface may be an appropriate network that facilitates communication between any two of the multiple processors, between any processor and any of the memory devices, etc. The local interface may comprise additional systems designed to coordinate this communication, including, for example, performing load balancing. The processor may be of electrical or of some other available construction.

The client device 101 may include a display upon which a user interface generated by the mail client 241 or another application can be rendered. The client device 101 may also include one or more input/output devices that may include, for example, a capacitive touchscreen or other type of touch input device, fingerprint reader, keyboard, etc.

Although the mail client 241 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram and flowcharts show an example of the functionality and operation of an implementation of portions of components described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the sequence diagram flowcharts show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some examples, one or more of the blocks shown in the drawings may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, solid-state drives, flash memory, etc. Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices. Additionally, it is understood that terms such as "application," "service," "system," "engine," "module," and so on may be interchangeable and are not intended to be limiting.

It is emphasized that the above-described examples of the present disclosure are merely possible examples of implementations set forth for a clear understanding of the principles of the disclosure. Many variations and modifications may be made to the above-described examples without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed by the computing device, being configured to cause the computing device to at least:
   identify an email account associated with a user;
   determine that the user will be out of the office based upon a location indication received from a positioning system of a client device and by analyzing content of a particular email message associated with the email account and without the user providing manual input indicating that the user will be out of the office, wherein analyzing the content of the particular email message comprises identifying a travel indication based upon a format specification of a flight number, an airport code, or text identifying a hotel;
   identify a second user associated with a different email account, the second user identified based upon user group data identifying a group of users to which the user belongs, wherein the second user is identified as a manager or subordinate of the user by the user group data;
   generate an automatic reply associated with the email account, the automatic reply identifying an email address of the second user as a fallback contact for the user;
   associate the automatic reply with the email account; and
   automatically activate an automatic reply capability associated with the email account.

2. The non-transitory computer-readable medium of claim 1, wherein determining that the user will be out of the office further comprises analyzing a location indication received from the client device associated with the email account, the location indication indicating that the location of the client device is a threshold distance from a defined location associated with the email account.

3. The non-transitory computer-readable medium of claim 1, wherein determining that the user will be out of the office further comprises analyzing an event stored in a calendar associated with the email account, the event identifying a flight reservation associated with a flight from a defined location to a second location that is a threshold distance from the defined location.

4. The non-transitory computer-readable medium of claim 3, wherein determining that the user will be out of the office further comprises analyzing another event stored in the calendar, the other event identifying another flight reservation associated with a second flight from the second location to the defined location.

5. The non-transitory computer-readable medium of claim 4, wherein the automatic reply comprises a starting date associated with the flight and an ending date associated with the second flight.

6. The non-transitory computer-readable medium of claim 1, wherein the location indication that the user is out of office is identified based at least in part upon a semantic analysis of the particular email message.

7. The non-transitory computer-readable medium of claim 1, wherein analyzing the content of the particular email message comprises identifying a travel indication based upon a format specification of a flight number, an airport code, or text identifying a hotel.

8. A method, comprising:
determining that a user will be out of the office based upon a location indication received from a positioning system of a client device and by analyzing content of a particular email message associated with an email account and without the user providing manual input indicating that the user will be out of the office, wherein analyzing the content of the particular email message comprises identifying a travel indication based upon a format specification of a flight number, an airport code, or text identifying a hotel;
identifying a second user associated with a different email account, the second user identified based upon user group data identifying a group of users to which the user belongs, wherein the second user is identified as a manager or subordinate of the user by the user group data;
generating, in the client device, an automatic reply associated with the email account, the automatic reply identifying an email address of the second user as a fallback contact for the user;
associating, by the client device, the automatic reply with the email account; and
automatically activating, by the client device, an automatic reply capability associated with the email account.

9. The method of claim 8, wherein determining that the user will be out of the office comprises determining, based upon the location indication obtained from the positioning system that the client device is a threshold distance from a defined location associated with the email account.

10. The method of claim 8, wherein determining that the user will be out of the office further comprises analyzing an event stored in the calendar associated with the email account, the event comprising an indication that a user associated with the email account is a threshold distance from a defined location associated with the email account.

11. The method of claim 10, wherein the indication that the user associated with the email account is the threshold distance from the defined location associated with the email account comprises an identification of a particular location in the particular email message or a particular event in the calendar.

12. The method of claim 10, wherein the indication that the user associated with the email account is the threshold distance from the defined location associated with the email account comprises determining that the travel indication is associated with a location a threshold distance from the defined location.

13. The method of claim 8, wherein analyzing the content of the particular email message comprises identifying a travel indication based upon a format specification of a flight number, an airport code, or text identifying a hotel.

14. A method, comprising:
determining, in a computing device, that a user will be out of the office based upon a location indication received from a positioning system of a client device and by analyzing content of a particular email message associated with an email account and without the user providing manual input indicating that the user will be out of the office, wherein analyzing the content of the particular email message comprises identifying a travel indication based upon a format specification of a flight number, an airport code, or text identifying a hotel;
identifying a second user associated with a different email account, the second user identified based upon user group data identifying a group of users to which the user belongs, wherein the second user is identified as a manager or subordinate of the user by the user group data;
generating, in the computing device, an automatic reply associated with the email account in response to determining the user associated with the email account is out of office, the automatic reply identifying an email address of the second user as a fallback contact for the user;
associating, by the computing device, the automatic reply with the email account; and
automatically activating, by the computing device, an automatic reply capability associated with the email account.

15. The method of claim 14, wherein generating the automatic reply further comprises selecting, in the computing device, one of a plurality of automatic reply message templates based at least in part upon a sending user associated with a message received in the email account.

16. The method of claim 15, further comprising populating, by the computing device, the one of the plurality of automatic reply message templates with a beginning date and an end date.

17. The method of claim 15, wherein the second user is selected based at least in part upon an identity of the sending user of the message received in the email account.

* * * * *